(12) United States Patent
Koga et al.

(10) Patent No.: US 6,713,214 B2
(45) Date of Patent: Mar. 30, 2004

(54) POSITIVE ELECTRODE ACTIVE MATERIAL FOR SECONDARY BATTERY AND SECONDARY BATTERY

(75) Inventors: Hideyuki Koga, Hirakata (JP); Masahisa Fujimoto, Osaka (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 146 days.

(21) Appl. No.: 09/986,740

(22) Filed: Nov. 9, 2001

(65) Prior Publication Data

US 2002/0090550 A1 Jul. 11, 2002

(30) Foreign Application Priority Data

Nov. 13, 2000 (JP) .......................... 2000-344805
Mar. 27, 2001 (JP) .......................... 2001-090112

(51) Int. Cl.[7] .................... H01M 46/60; H01M 4/58; H01M 10/40
(52) U.S. Cl. .................... 429/213; 429/231.7; 429/329
(58) Field of Search .................... 429/213, 231.7, 429/329

(56) References Cited

U.S. PATENT DOCUMENTS

| 4,105,836 A | * | 8/1978 | Almerini ............. 429/231.7 X |
| 4,770,959 A | * | 9/1988 | Koyama et al. ..... 429/231.7 X |
| 5,089,359 A | * | 2/1992 | Ohsawa et al. ......... 429/213 X |
| 5,491,041 A | * | 2/1996 | Abraham et al. ....... 429/213 X |
| 6,120,940 A | * | 9/2000 | Poehler et al. .......... 429/213 X |
| 6,358,649 B1 | * | 3/2002 | Yazami et al. ........... 429/231.7 |
| 6,383,640 B1 | * | 5/2002 | Shi et al. ................. 429/213 X |
| 6,509,116 B1 | * | 1/2003 | Kaneko et al. ............. 429/213 |

FOREIGN PATENT DOCUMENTS

JP  61-116759  6/1986

OTHER PUBLICATIONS

Shu, Z. X. et al.; "Effect of 12 Crown 4 on the Electrochemical Intercalation of Lithium into Graphite"; *J. Electrochem. Soc.*; vol. 140, No. 6, pp. L101–L103; Jun. 1993.

* cited by examiner

*Primary Examiner*—Stephen Kalafut
(74) *Attorney, Agent, or Firm*—Kubovcik & Kubovcik

(57) ABSTRACT

A secondary battery is characterized by using an organic material including carbon having a conjugate electron cloud and coupled with an electron attractive group; or a material obtained by baking a fluorocarbon polymer or graphite fluoride in an inert atmosphere at a temperature in the range of from the decomposition start temperature to 1000° C., as a positive electrode active material for the secondary battery.

29 Claims, 4 Drawing Sheets

POSITIVE ELECTRODE ACTIVE MATERIAL FOR SECONDARY BATTERY AND SECONDARY BATTERY

BACKGROUND OF THE INVENTION

1. Field of the Invention

The present invention relates to a positive electrode active material that can be used in a secondary battery such as a lithium secondary battery, and to a secondary battery using the same, and to a lithium secondary battery using graphite fluoride as a positive electrode active material.

2. Related Art

Along with the wide spread use and development of portable equipment in recent years, a demand for a battery with a high energy density, which is a power supply, has been further piled up. Since a lithium secondary battery can be expected to be a high energy density, various systems thereof have been studied.

While, in connection with a negative electrode, lithium metal, lithium alloys, carbon materials and metal oxide materials have been studied, the carbon materials are at present in the actual use because of the excellent reversibility and abundant resources thereof regardless of the least capacity thereof among the above kinds.

While, in connection with a positive electrode, oxides, halides, chalcogenides and the like are promising candidates, transition metal oxides such as $MnO_2$, $V_2O_5$ and $LiCoO_2$ are now put into practical use. The transition metal oxides include a heavy metal and are problematic for its expensiveness and other reasons.

As other positive electrode active materials for a secondary battery, elemental sulfur, sulfur compounds and conductive polymers are named. However, since elemental sulfur and sulfur compounds include sulfur, there are problems such as nasty smell and others, making the materials incompatible with a work place environment. In a conductive polymer, since carriers to transport an electric charge during charge/discharge are not lithium ions but anions, a battery capacity is governed by an anion concentration in an electrolyte and the conductive polymer has a fatal problem in point of increase in the battery capacity.

As a positive electrode active material for a lithium primary battery, graphite fluoride is used. Graphite fluoride is formed by C-F bonds and, therefore, an electrode reaction thereof is to reduce a C-F bond with Li, thereby producing LiF and C. Since the reaction product is LiF having almost no solubility in an electrolyte, a charge reaction is hard to occur and there is difficulty in using graphite fluoride as an electrode for a secondary battery.

As described above, a positive electrode active material, including no heavy metal, and with environmental compatibility, has been desired as a positive electrode active material for a lithium secondary battery.

SUMMARY OF THE INVENTION

It is a first object of the present invention to provide a novel positive electrode active material for a secondary battery that can solve the above problem and a secondary battery using the same.

It is a second object of the present invention to provide a lithium secondary battery, using graphite fluoride as a positive electrode active material, and having a high capacity and excellence in cycle performance.

A positive electrode active material for a secondary battery according to a first aspect of the present invention is constituted of an organic material including a carbon atom, having a conjugate electron cloud, and coupled with an electron attractive group.

When the electron attractive group is in coupling with a carbon having a conjugate electron cloud, an electron density in the conjugate electron cloud decreases, causing a state of the conjugate electron cloud to be similar to a state assuming as if an electron in the conjugate electron cloud is withdrawn: an oxidized state is produced in the broad sense. If the conjugate electron cloud is put into an oxidized state, a doping potential of an Li (lithium) ion shifts to the noble side (positive side), as compared with that of the ion having the conjugate electron cloud in an ordinary neutral state. Accordingly, charge/discharge at a higher potential is enabled; thus, the organic material can be used as a positive electrode active material.

In discharge, doping of an Li ion and injection of an electron into the conjugate electron cloud occur, while in charge, dedoping of an Li ion and withdrawal of an electron from the conjugate electron cloud occur. Since the reactions are reversible, charge/discharge at a high potential is enabled.

As an active material according to the first aspect of the present invention, an organic material having an aromatic ring at least part of which is substituted by an electron attractive group is named. One example of such an organic material is an aromatic condensed polycyclic hydrocarbon at least part of which is substituted by an electron attractive group. The hydrocarbon is a compound obtained by substituting part of hydrogen atoms of a polycyclic hydrocarbon having aromatic rings condensed together such as anthracene, pyrene, naphthalene or the like with an electron attractive group.

Furthermore, as another example, a polymer of an aromatic compound such as benzene with an electron attractive group or electron attractive groups substituting part of hydrogen atoms thereof is named. As such a benzene polymer, a polymer expressed by the following general formula can be named:

[Chem. 1]

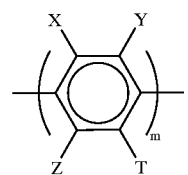

where X, Y, Z and T are hydrogen, fluorine, or $C_nF_{2n+1}$ providing that n is an integer of 0 or more, at least one of X, Y, Z and T is fluorine or $C_nF_{2n+1}$, and m is an integer of 0 or more.

To be concrete, for example, a polymer of fluorobenzene, a polymer of trifluoromethylbenzene or the like is named.

As polymers of fluorobenzene, polymers of the following specific fluorobenzenes are named: monofluorobenzene, paradifluorobenzene, orthodifluorobenzene, metadifluorobenzene, 1,2,3-trifluorobenzene, 1,2,4-trifluorobenzene, 1,3,5-trifluorobenzene, 1,2,3,4-tetrafluorobenzene, 1,2,3,5-tetrafluorobenzene and 1,2,4,5-tetrafluorobenzene and others.

Furthermore, as polymers of trifluoromethylbenzene, polymers of the following specific trifluoromethylbenzenes are named: ααα-trifluorotoluene, paraditrifluoromethylbenzene, orthoditrifluoromethylbenzene, 1,2,3- tristrifluoromethylbenzene, 1,2,4-tristrifluoromethylbenzene, 1,3,5-tristrifluoromethylbenzene, 1,2,3,4-tetratrifluoromethylbenzene, 1,2,3,5-tetratrifluoromethylbenzene and 1,2,4,5-tetratrifluoromethylbenzene and others.

As an electron attractive group, as described above, fluorine or a fluoroalkyl group is named. The fluoroalkyl group is a group expressed by $C_nF_{2n+1}$, wherein n is a natural number, and to be specific, trifluoromethyl group is named as described above.

A positive electrode active material for a secondary battery according to a second aspect of the present invention is characterized by constituting of a material obtained by baking a fluorocarbon polymer in an inert atmosphere at a temperature in the range of from a decomposition start temperature to 1000° C. As fluorocarbon polymers, polyvinyl fluoride, polyvinylidene fluoride, polytetrafluoroethylene, polyfluoroethylenepropylene, a copolymer of vinylidene fluoride and hexafluoropropylene, and others are named.

A positive electrode active material for a secondary battery according to a third aspect of the present invention is characterized by constituting of a material obtained by baking graphite fluoride in an inert atmosphere at a temperature in the range of from a decomposition start temperature to 1000° C. A heat treatment temperature of graphite fluoride is preferably on the order of the range of 400 to 550° C.

A secondary battery according to a fourth aspect of the present invention is characterized by including a positive electrode containing a positive electrode active material according to any of the first to third aspect of the present invention, a negative electrode and a nonaqueous electrolyte.

In a secondary battery according to the fourth aspect of the present invention, the negative electrode preferably contains an active material absorbing and releasing alkali metal or alkali earth metal.

In the present invention, it is preferable that the alkali metal is lithium and the secondary battery is a lithium secondary battery.

In the present invention, the negative active material is preferably at least one selected from a carbon material, silicon, tin and aluminum.

Furthermore, in a secondary battery according to the fourth aspect of the present invention, alkali metal or alkali earth metal is included in the positive electrode active material or the negative active material in advance.

A solvent for an electrolyte used in a case that a secondary battery according to the fourth aspect of the present invention is a lithium secondary battery is not specifically limited and the following solvents are illustrated: mixed solvents composed of cyclic carbonates such as ethylene carbonate, polypropylene carbonate, butylene carbonate, vinylene carbonate and others; and chain carbonates such as dimethyl carbonate, methyl ethyl carbonate, diethyl carbonate, and others. In addition thereto, mixed solvents composed of the cyclic carbonate described above and an ether system solvent such as 1,2-dimethoxy ethane or 1,2-diethoxyethane are illustrated. Furthermore, as solutes of electrolytes, the following compounds are illustrated: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and others, and a mixture thereof. Moreover, as electrolytes, the following compounds are exemplified: gelatinous polymer electrolytes obtained by impregnating polymer electrolytes such as polyethylene oxide, polyacrylonitrile and others with an electrolyte; and inorganic solid electrolytes such as LiI and $Li_3N$. An electrolyte can be used without any limitation thereon in a lithium secondary battery as long as a Li compound as a solute for revealing ionic conductivity and a solvent for dissolving and preserving the Li compound are not decomposed at voltages in charge, in discharge of the battery or in storage.

A lithium secondary battery according to a fifth aspect of the present invention is characterized by including; a positive electrode constituted of graphite fluoride, a negative electrode capable of absorbing and releasing lithium, a solute containing lithium; and an electrolyte solvent containing a stabilizing solvent producing a stable intermediate with lithium intercalated between interlayers of graphite fluoride by discharge and with fluorine constituting the graphite fluoride.

As the stabilizing solvent used in the fifth aspect of the present invention, the following compounds are named: a cyclic carbonate, a chain carbonate and a crown ether. As the crown ethers, specific examples are named as follows: 12-crown-4, 14-crown-4, 15-crown-5 and 18-crown-6. Among them, 12-crown-4 is especially preferable.

In the fifth aspect of the present invention, as the graphite fluoride used as a positive electrode active material, a compound expressed by $(C_xF)_n$, wherein X is 1, 2 or 4, for example, are named.

As the negative electrode used in the fifth aspect of the present invention, the negative electrodes which have any one of following materials as negative active materials are named: graphite, silicon, germanium, and a silicon-germanium alloy.

In a book entitled "Graphite Intercalation Compounds" authored by Nobuatsu Watanabe and published by Kindai Henshu Sha, an analysis of an insertion reaction of a lithium ion with graphite fluoride is described. According to the analysis, a lithium ion is intercalated into interlayers of graphite fluoride while the lithium ion being in a solvated state and a discharged fluorine ion ($F^{-1}$) form an ion pair, resulting in a metastable graphite intercalation compound. Actually, since an open circuit voltage is different in a case that propylene carbonate, γ-butyrolactone, dimethyl sulfoxide or sulfolane is used as the electrolyte solvent, it is conceived that a solvent participates in a discharge reaction. That is, it is considered that during discharge, an intermediate "$Li^+$—solvent—$F^-$" is produced and this intermediate is subjected to gradual desolvation to produce LiF. This intermediate "$Li^+$—solvent—$F^-$" is in a metastable state and it is considered that a lifetime is longer with increase in degree of salvation between a solvent and a lithium ion. The inventors of the present invention have thought that if lithium and fluorine are in the state of the intermediate "$Li^+$—solvent—$F^-$" where no perfect bond is formed between lithium and fluorine, $(CF)_n$ and a lithium ion could be reproduced in charge. In order to realize this, there is a necessity for production of a long-lived intermediate "$Li^+$—solvent—$F^-$". It is a salvation energy with a lithium ion to determine a lifetime of the intermediate "$Li^+$—solvent—$F^-$" and it is important to use a solvent with the salvation energy as high as possible. As a result, lithium fluoride (LiF), which is hard to be dissolved in an electrolyte, is hard to be produced, thereby enabling application of graphite fluoride to a secondary battery.

As solvents having a high salvation energy with a lithium ion, the following compounds are exemplified: dimethyl sulfoxide, ethyleneglycoldiethyl ether, a crown ether and others. Especially, ethyleneglycoldiethyl ether and a crown ether have each a metal cation capturing function; therefore, it is considered that such solvents are each easy to form a stable complex with a metal ion such as a lithium ion, thus increasing a lifetime of the intermediate "$Li^+$—solvent—$F^-$".

While, as the crown ethers, the following compounds are named: a cyclic polyether, a cyclic polyamine, a cyclic polythiaether, a complex donor-crown compound, a bicyclic crown compound, an optically active crown compound and those having various kinds of functional groups, and others, a compound, among them, of which a salvation with a lithium ion has well been studied is the cyclic polyether. Specific examples of the cyclic polyether are 12-crown-4, 14-crown-4, 15-crown-5, 18-crown-6 and others, however, a compound, among them, whose compatibility with a lithium ion is especially good is 12-crown-4.

In the present invention, as materials of a separator that insulates electrically a positive electrode and a negative electrode from each other, materials absorbing an electrolyte such as a polypropylene non-woven fabric, a microporous polypropylene film, a microporous polypropylene non-woven fabric and others are named.

As the nonaqueous electrolyte in the fifth aspect of the present invention, solutions including the above stabilizing solvents are named. Solvents other than the above stabilizing solvents may be included in the solutions and as such solvents, the following compounds are named: cyclic carboxylic acid esters such as ethylene carbonate, propylene carbonate and γ-butyrolactone. Moreover, as such solvents, the following are named: mixed solvents composed of the cyclic carboxylic acid esters and chain carboxylic acid esters such as dimethyl carbonate, diethyl carbonate, ethyl methyl carbonate, methylacetate and others; and still in addition, the following other solvents may be used: a solvent obtained by adding a cyclic ether such as tetrahydrofuran and a chain ether such as 1,2-dimethoxyethane to the above mixed solvents. As solutes in the nonaqueous electrolyte, no specific limitation is imposed, and solutes similar to those described in the fourth aspect can be used.

DESCRIPTION OF THE PREFERRED EMBODIMENTS

Although the present invention is described more specifically with reference to embodiments below, it should be understood that the present invention is not restricted to the following embodiments but can be performed in proper modifications or alterations without departing from the scopes of the present invention.

EXPERIMENT 1

(Fabrication of Positive Electrode)

After polyvinylidene fluoride was dissolved into N-methyl-2-pyrrolidone and the solution was coated on an aluminum foil and the coat was dried, the coat was baked in a vacuum atmosphere at 400° C. for 30 hr. After the baking, the coated aluminum foil was dried in a vacuum at 110° C., followed by cutting the coated aluminum foil into a size of 2 cm×2 cm to fabricate a positive electrode.

(Fabrication of Test Cell)

With the positive electrode fabricated as described above used as a working electrode, a test cell was prepared using lithium metal as a counter electrode and a reference electrode. As an electrolyte, a solution obtained by dissolving 1 mol/l of $LiPF_6$ into a mixed solvent containing propylene carbonate and dimethyl carbonate in the ratio by volume of 1 to 1 was used. Note that in the test cell, reduction of the working electrode was charge and oxidation thereof was discharge.

(Charge/Discharge Test)

In the above test cell, a charge/discharge test was performed at 25° C. The discharge was performed at a constant current of 0.5 $\mu A/cm^2$ until a potential relative to the reference electrode used as a standard reached 1.5 V, and charge was performed at a constant current of −0.5 $\mu A/cm^2$ until a potential relative to the reference electrode reached 3.94 V.

Figure 1:
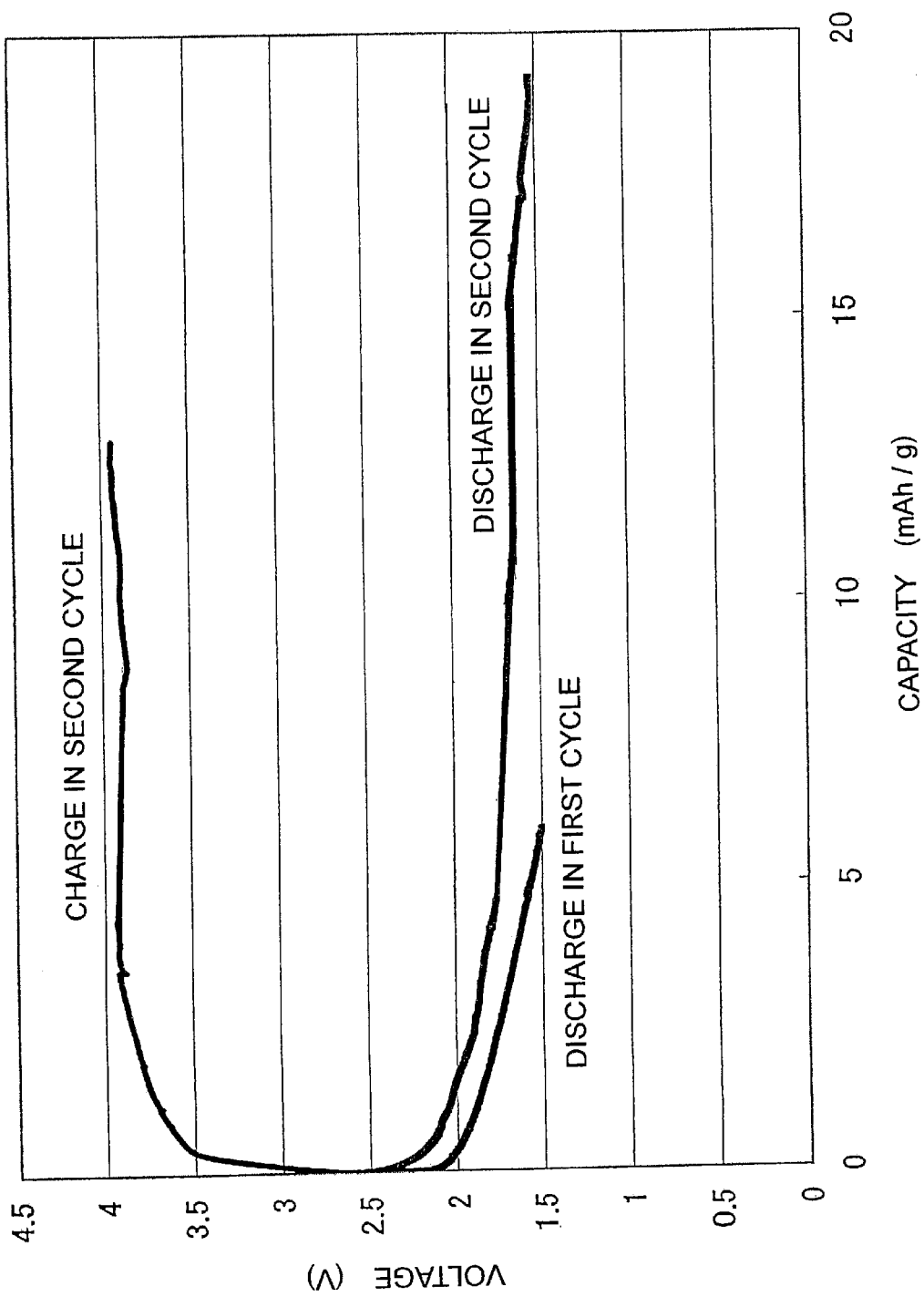
FIG. 1 is a graph showing a charge/discharge curve of a secondary battery using a positive electrode fabricated in an embodiment according to the present invention.
Figure 2:
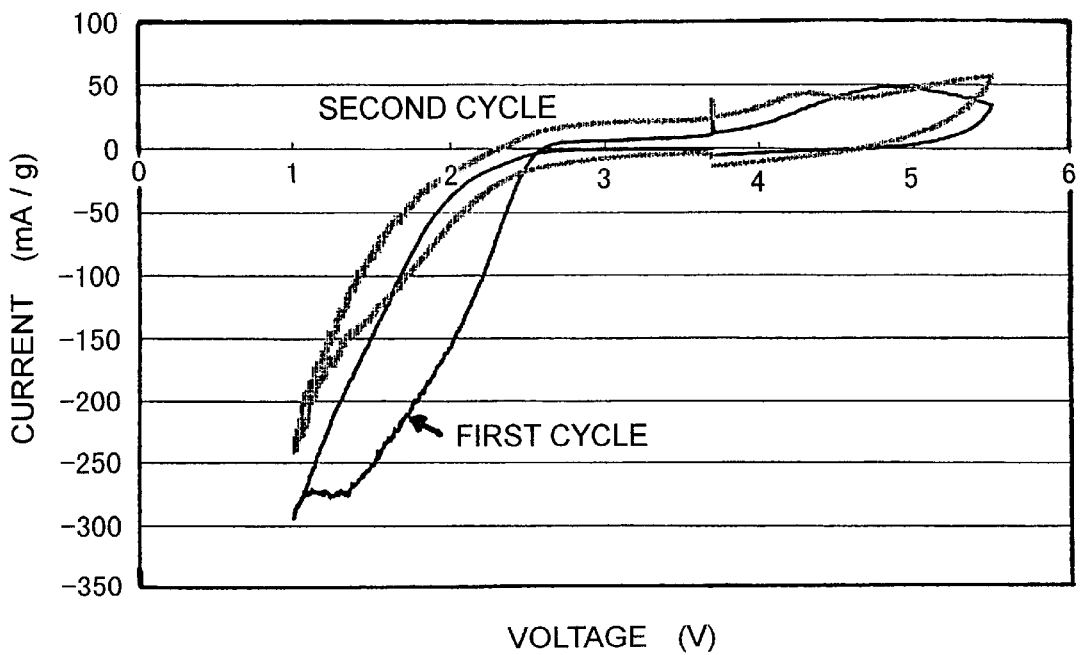
FIG. 2 is a graph showing a cyclic voltammogram when propylene carbonate is used as a solvent.
Figure 3:
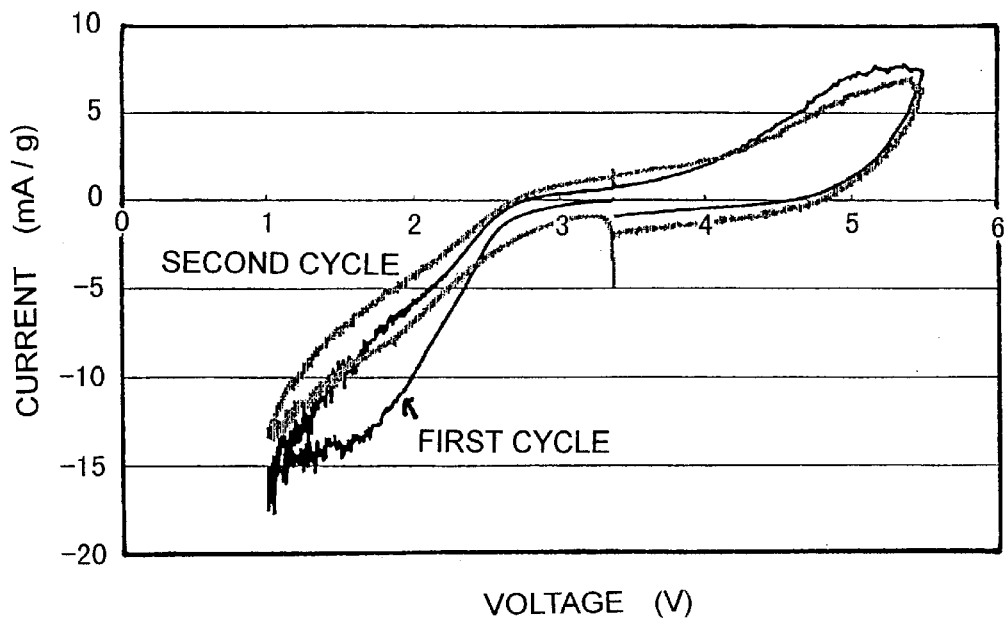
FIG. 3 is a graph showing a cyclic voltammogram when propylene carbonate and ethylene carbonate are used as a solvent.
Figure 4:
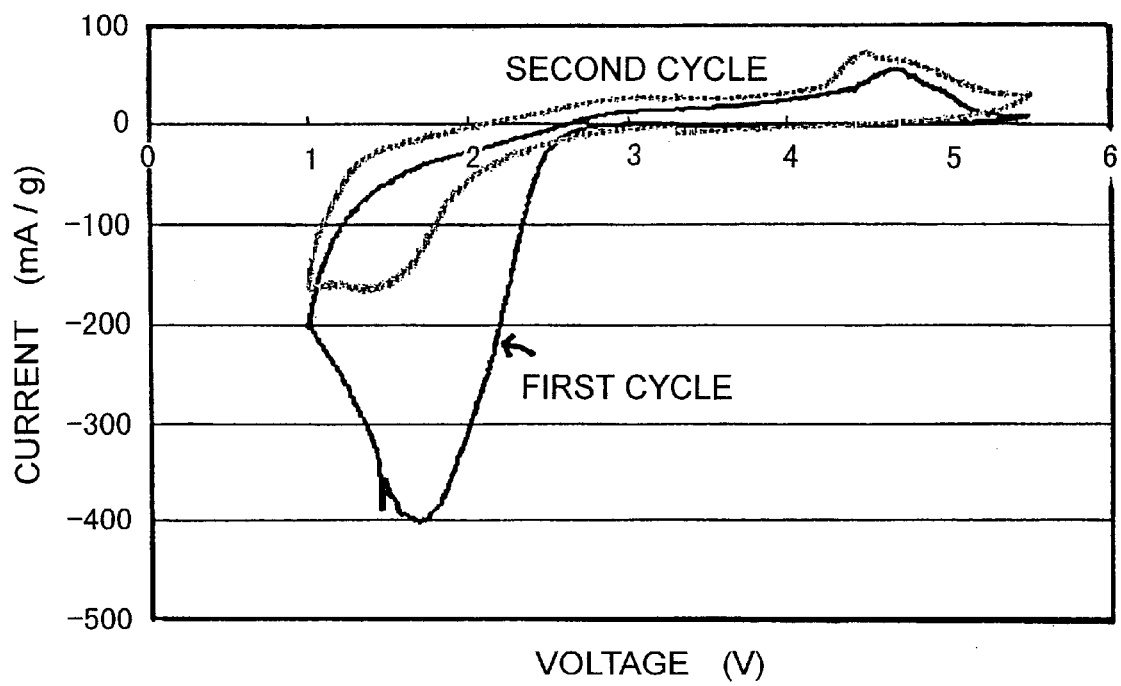
FIG. 4 is a graph showing a cyclic voltammogram when propylene carbonate and 12-crown-4 are used as a solvent.
Figure 5:
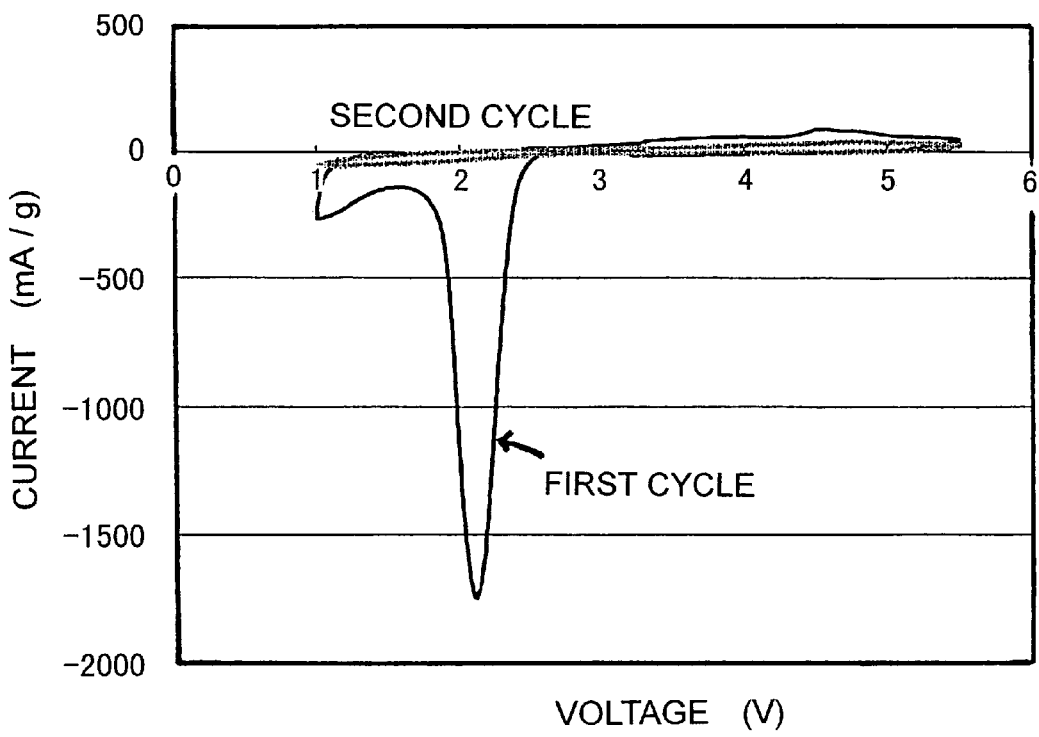
FIG. 5 is a graph showing a cyclic voltammogram when ethylene carbonate and dimethyl carbonate are used as a solvent.

FIG. 1 is a graph showing charge/discharge curve, which indicates discharge curves in a first cycle and a second cycle and a charge curve in the second cycle. As is apparent from FIG. 1, it is found that the electrode fabricated is capable of charge/discharge and excellent in reversibility with the end of a discharge voltage as high as 1.5 V or more.

According to the first to fourth aspects of the present invention, a positive electrode active material, containing neither a heavy metal of a high price nor sulfur poor in environmental compatibility, and having reversibility can be obtained.

EXPERIMENT 2

Description will be given below of specific examples of an electrolyte for a lithium secondary battery according to the fifth aspect of the present invention and a test cell using the same.

Cyclic voltammograms were measured to investigate possibility of charge, using graphite fluoride $(CF)_n$ as an electrode material and solvents in which $LiPF_6$ was dissolved at a concentration of 1 mol/l to prepare electrolytes. The solvents as stabilizing solvents studied thereon in this experiment are 4 kinds of solvents including propylene carbonate (PC, a cyclic carbonate) alone; a mixed solvent in equal volumes of propylene carbonate (PC, a cyclic carbonate) and ethylene carbonate (EC, a cyclic carbonate); a mixed solvent in equal volumes of propylene carbonate and 12-crown-4 (a crown ether); and a mixed solvent in equal volumes of ethylene carbonate and dimethyl carbonate (DMC).

(Fabrication of Test Cells)

Graphite fluoride $(CF)_n$ produced by Central Glass Co., Ltd. as a starting material, acetylene black as conductive material, and polyvinylidene fluoride as a binder were mixed so as to obtain a composition of 80 parts by weight, 10 parts by weight and 10 parts by weight, respectively; a slurry was prepared from the mixture using N-methyl-2-pyrrolidone;

after the slurry was applied on an aluminum foil that serves as a current collector, the coat on the aluminum foil was dried in a vacuum at 110° C., followed by shaping to fabricate a working electrode. Note that when a secondary battery is assembled, the working electrode functions as a positive electrode. Furthermore, lithium metal was shaped and used directly as a counter electrode and a reference electrode. The above 4 kinds of solvents were used as electrolytes.

The working electrode and the counter electrode fabricated in such a way were held being sandwiched by glass plates with a separator inserted between the electrodes and put into a beaker together with the reference electrode, followed by pouring each electrolyte (including one of the 4 kinds of stabilizing solvents) thereinto to constitute 4 kinds of the test cells.

Note that as the current collector of the above positive electrode, a current collector made of aluminum or tantalum, both hard to be dissolved at even a high potential is preferably used.

(Measurement of Cyclic Voltammograms)

Charge/discharge operations were carried out on each cell in conditions of a potential scanning speed of 278 $\mu$V/sec, a potential scanning range of from 1.0 to 5.5 vs. Li/Li$^+$, first proceeding in the direction from the open circuit potential to the anodic side and then returning in the direction to the cathodic side (one cycle) in a total of two cycles.

(Result 1)

Cyclic voltammograms of the respective test cells are shown in FIGS. 2 to 5. FIGS. 2 to 5 are voltammograms in the first and second cycles of when PC was used as the solvent; when the mixed solvent in equal volumes of PC and EC was used; when the mixed solvent in equal volumes of PC and 12-crown-4 was used; and when the mixed solvent in equal volumes of EC and DMC was used, respectively. Moreover, in Table 1, current amounts in the direction of oxidation and reduction obtained from the cyclic voltammograms are described and values obtained by dividing the current amounts in the directions of oxidation and reduction in the first and second cycles by a weight of the working electrode are shown.

TABLE 1

| Electrolyte Solvent (Stabilizing Solvent) | Current Amounts in Oxidation Direction (mAh/g) | | Current Amounts in Reduction Direction (mAh/g) | |
|---|---|---|---|---|
| | First Cycle | Second Cycle | First Cycle | Second Cycle |
| PC | 76 | 114 | 444 | 269 |
| PC/EC | 11 | 10 | 30 | 25 |
| PC/12-crown-4 | 68 | 120 | 485 | 202 |
| EC/DMC | 171 | 79 | 745 | 88 |

As shown in Table 1, a cathodic current amount corresponding to charge, that is, a current amount in the direction of oxidation was culminated in the system containing 12-crown-4 and in addition, increase in current amount was observed in the second cycle, compared with that in the first cycle. Moreover, an anodic current corresponding to discharge, that is, a current in the direction of reduction was observed in correspondence to charge and it was found that graphite fluoride (CF)$_n$ has sufficient reversibility in the system containing 12-crown-4. That is, it is understood that with inclusion of a stabilizing solvent such as a crown ether having a strong salvation with a lithium ion in an electrolyte, a secondary battery using graphite fluoride (CF)$_n$ as a positive electrode can be worked.

(Result 2)

Figure 6:
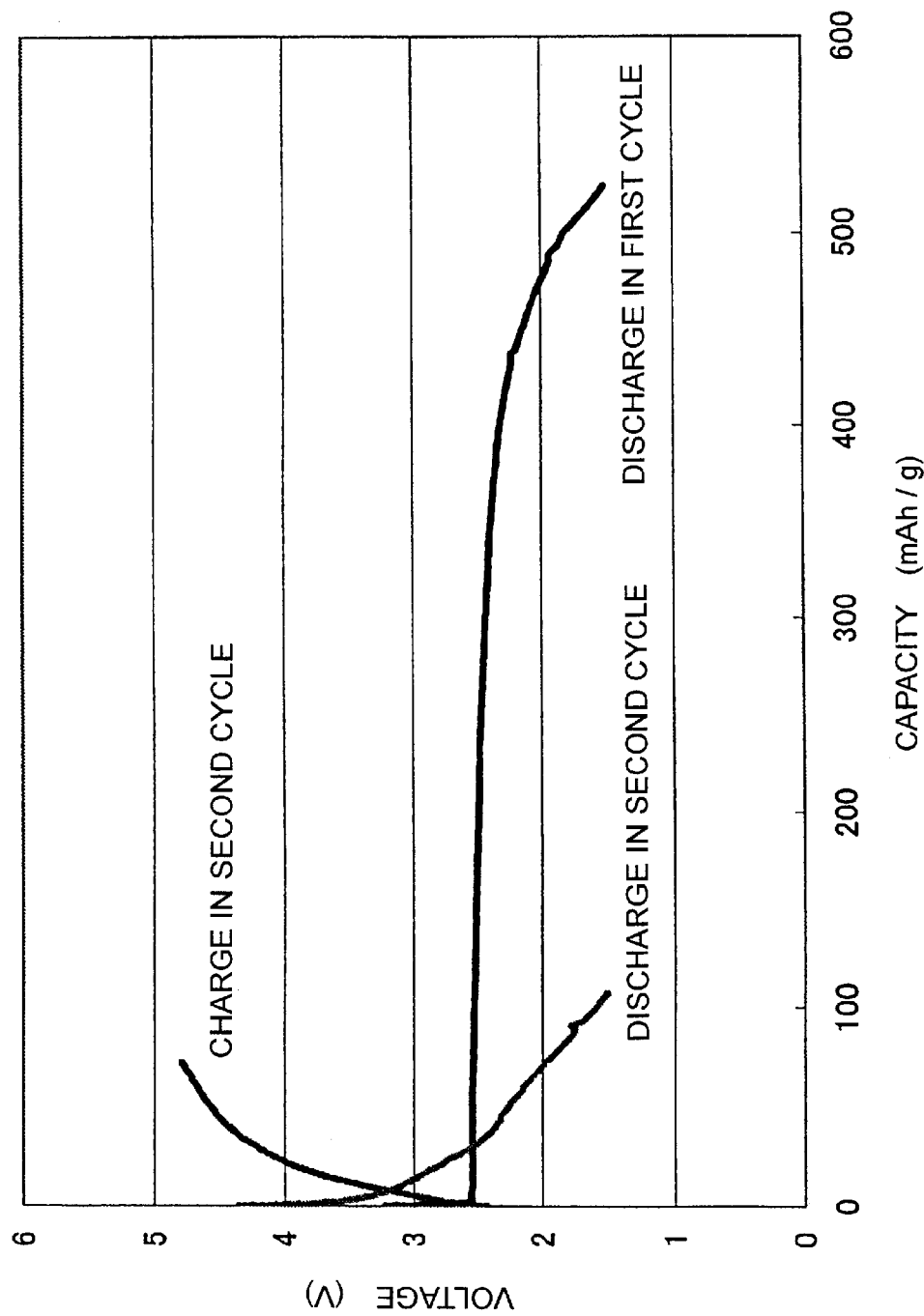
FIG. 6 is a graph showing a relationship between a capacity and a voltage of a test cell.

A charge/discharge characteristic graph of a test cell using a mixed solvent in equal volumes of the PC and 12-crown-4 is shown in FIG. 6. FIG. 6 is a graph showing a relationship between a capacity and a voltage of the test cell.

Measurement was performed by charge/discharge in conditions of a constant current of 0.25 mAh/cm$^2$ and a potential range of from 1.5 to 4.8 V vs. Li/Li$^+$. To be detailed, discharge in the first cycle was performed down to 1.5 V at a constant current of 0.25 mAh/cm$^2$ to obtain a discharge capacity of 524 mAh/g, charge in the second cycle was performed up to 4.8 V at a constant current of 0.25 mAh/cm$^2$ to obtain a charge capacity of 72 mAh/g and thereafter, discharge was performed down to 1.5 V at a constant current of 0.25 mAh/cm$^2$ to, as a result, obtain a discharge capacity of 107 mah/cm$^2$. With such results, a possibility of charge/discharge of a secondary battery using graphite fluoride (CF)$_n$ as a positive electrode is revealed.

According to the fifth aspect of the present invention, with inclusion of a stabilizing solvent having a nature to produce a stable intermediate with lithium intercalated between interlayers of the graphite fluoride by discharge and with fluorine constituting graphite fluoride in an electrolyte, reversibility is given to a positive electrode constituted of graphite fluoride, thereby enabling a secondary battery having a high capacity and excellence in cycle performance to be provided.

What is claimed is:

1. A secondary battery comprising, an organic material including a carbon having a conjugate electron cloud and coupled with an electron attractive group, a negative electrode, and a non-aqueous electrolyte, wherein said negative electrode active material is at least one kind selected from a carbon material, silicon, tin, aluminum and lithium metal.

2. The secondary battery according to claim 1, wherein said organic material has an aromatic ring at least part of which is substituted by said electron attractive group.

3. The secondary battery according to claim 1, wherein said organic material has an aromatic condensed polycyclic hydrocarbon at least part of which is substituted by said electron attractive group.

4. The secondary battery according to claim 1, wherein said electron attractive group is fluorine or a fluoroalkyl group.

5. The secondary battery according to claim 4, wherein said fluoroalkyl group is a group expressed by $C_nF_{2n+1}$, wherein n is natural number.

6. The secondary battery according to claim 1, wherein said organic material is a polymer of fluorobenzene.

7. The secondary battery according to claim 1, wherein said organic material is at least one kind of a polymer of fluorobenzene selected from monofluorobenzene, paradifluorobenzene, orthodifluorobenzene, metadifluorobenzene, 1,2,3-trifluorobenzene, 1,2,4-trifluorobenzene, 1,3,5-trifluorobenzene, 1,2,3,4-tetrafluorobenzene, 1,2,3,5-tetrafluorobenzene and 1,2,4,5-tetrafluorobenzene.

8. The secondary battery according to claim 1, wherein alkali metal or alkaline earth metal is included in said positive electrode active material or said negative active material in advance.

9. The secondary battery according to claim 8, wherein said alkali metal is lithium and said secondary battery is a lithium secondary battery.

10. An electrode for a secondary battery comprising, a material obtained by baking a fluorocarbon polymer in an inert atmosphere at a temperature in the range of from the decomposition start temperature to 1000° C.

11. An electrode for a secondary battery according to claim 10, wherein said fluorocarbon polymer is at least one kind of fluorocarbon polymer selected from polyvinyl fluoride, polyvinylidene fluoride, polytetrafluoroethylene, polyfluoroethylenepropylene and a copolymer of vinylidene fluoride and hexafluoropropylene.

12. An electrode for a secondary battery comprising, a material obtained by baking graphite fluoride in an inert atmosphere at a temperature in the range of from the decomposition start temperature to 1000° C.

13. An electrode for a secondary battery according to claim 12, wherein said baking temperature is in the range of from 400 to 550° C.

14. A secondary battery comprising, a positive electrode containing as an active material, a material obtained by baking a fluorocarbon polymer in an inert atmosphere at a temperature in the range of from the decomposition start temperature to 1000° C., a negative electrode and a non-aqueous electrolyte.

15. The secondary battery according to claim 14, wherein said negative electrode contains an active material absorbing and releasing alkali metal or alkaline earth metal.

16. The secondary battery according to claim 15, wherein said active material is at least one kind selected from a carbon material, silicon, tin and aluminum.

17. The secondary battery according to claim 14, wherein alkali metal or alkaline earth metal is included in said positive electrode active material or said negative active material in advance.

18. The secondary battery according to claim 14, wherein said alkali metal is lithium and said secondary battery is a lithium secondary battery.

19. A secondary battery comprising, a positive electrode containing as an active material, a material obtained by baking graphite fluoride in an inert atmosphere at a temperature in the range of from the decomposition start temperature to 1000° C., a negative electrode and a nonaqueous electrolyte.

20. The secondary battery according to claim 19, wherein said negative electrode contains an active material absorbing and releasing alkali metal or alkaline earth metal.

21. The secondary battery according to claim 20, wherein said negative electrode active material is at least one kind selected from a carbon material, silicon, tin, aluminum and lithium metal.

22. The secondary battery according to claim 19, wherein alkali metal or alkaline earth metal is included in said positive electrode active material or said negative active material in advance.

23. The secondary battery according to claim 19, wherein said alkali metal is lithium and said secondary battery is a lithium secondary battery.

24. A lithium secondary battery comprising: a positive electrode constituted of graphite fluoride; a negative electrode capable of absorbing and releasing lithium; a solute containing lithium; and an electrolyte solvent including a crown ether as a stabilizing solvent producing a stable intermediate with lithium intercalated between interlayers of graphite fluoride by discharge and with fluorine contained in the graphite fluoride.

25. The lithium secondary battery according to claim 24, wherein said negative electrode is any one of graphite, silicon, germanium, and a silicon-germanium alloy.

26. The lithium secondary battery according to claim 24, wherein said crown ether is at least one kind selected from 12-crown-4, 14-crown-4, 15-crown-5 and 18-crown-6.

27. The lithium secondary battery according to claim 24, wherein said crown ether is 12-crown-4.

28. The lithium secondary battery according to claim 24, wherein said negative electrode is any one of silicon, germanium, a silicon-germanium alloy and lithium metal.

29. A positive electrode active material for a secondary battery comprising, an organic material including a carbon having a conjugate electron cloud and coupled with an electron attractive group, wherein said organic material is at least one kind of a polymer of trifluoromethylbenzene selected from a,a,a-trifluorotoluene, paraditrifluoromethylbenzene, orthoditrifluoromethylbenzene, 1,2,3-tristrifluoromethylbenzene, 1,2,4-tristrifluoromethylbenzene, 1,3,5-tristrifluoromethylbenzene, 1,2,3,4-tetratrifluoromethylbenzene, 1,2,3,5-tetratrifluoromethylbenzene and 1,2,4,5-tetratrifluoromethylbenzene.

* * * * *